Aug. 15, 1961

R. B. BARNES ET AL 2,995,973

IN-LINE SPECTROMETER

Filed Oct. 23, 1959

ROBERT BOWLING BARNES
PHILIP WARDHAM COLLYER

*INVENTOR.*

BY

*ATTORNEY*

ROBERT BOWLING BARNES
PHILIP WARDHAM COLLYER
INVENTOR.

BY
ATTORNEY

ROBERT BOWLING BARNES
PHILIP WARDHAM COLLYER
*INVENTOR.*

BY *Robert Ames Norris*

*ATTORNEY*

United States Patent Office 2,995,973
Patented Aug. 15, 1961

1

2,995,973
IN-LINE SPECTROMETER
Robert Bowling Barnes and Philip Wardham Collyer, Stamford, Conn., assignors to Barnes Engineering Company, Stamford, Conn., a corporation of Delaware
Filed Oct. 23, 1959, Ser. No. 848,297
5 Claims. (Cl. 88—14)

This invention relates to an improved mobile spectrometer which can be used in the visible, ultraviolet and infrared ranges. In fact it is useful for any optical radiation, that is to say, electromagnetic radiations of wavelengths such that they obey the laws of geometric optics.

Spectrometers are common instruments in the laboratory and where there is a fixed location and plenty of space the large size of many of the instruments presents no significant problem. However, where it is desired to make spectrographic or spectrometric observations in the field, for example, instruments mounted on aircraft, missiles, satellites and the like, the ordinary types of spectrometers are not suitable. For mobile use it is necessary not only that the spectrometer be light and compact but that it be extremely rugged and capable of being aimed by suitable aiming or tracking mechanism. For practical purposes this requires an "in-line" instrument which can be mounted in a tube, preferably of circular cross section.

Another problem in mobile instruments is versatility and repair. This is a particularly serious question, when the instrument is to be used by the military. Such uses are normally far from well-equipped repair shops and it is desirable to have an instrument in which component portions or rather component assemblies of elements can be replaced as a whole by only moderately skilled technicians. The instruments of the present invention, in a preferred physical form, can be mounted in tubular sections which can be fastened together and provide automatic alignment. This is difficult or completely impractical in instruments which are not in line, that is to say, instruments in which the path of optical radiations is not through a series of components aligned on an optical axis.

Another advantage of the present invention is that it is readily adaptable to the use of interchangeable detectors. Thus, for example, it is easy to mount on the end of the tube either cameras for observation in the ultraviolet, visible and infrared, other types of detectors such as various infrared detectors, recording or non-recording, and the instrument is therefore usable with a number of different detecting and recording systems without redesign. In general, the invention is not concerned with the particular detector or recorder as these instruments can be of standard conventional design. It is an added advantage of the present invention, however, that no special design of a detector is needed and the instrument can be used with standard equipment.

The element of the present invention which produces a spectrum is a grating. Prisms, particularly prisms which can be operated in the infrared, are too bulky and in some cases too fragile for practical use. Furthermore, spectra produced by prisms are very nonlinear with respect to wavelength as compared with those produced by gratings. Also, the instrument uses reflecting optics which makes for many advantages such as wide range of utility with optical radiations running from the ultraviolet to the far infrared, ruggedness, lack of chromatic aberration and the like.

While it is practical to use an instrument in which the grating is illuminated by collimated light it had been considered axiomatic that gratings could not be used with converging radiation. The present invention uses such converging radiation on a grating to produce an extremely compact "in-line" instrument without encountering the difficulties of spectra from converging light on gratings

2 which without it would present an insuperable focusing problem. The solution of the focusing problem varies from satisfactory approximation over a useful bandwidth in the simples instruments to complete correction of focusing problems in the more elaborate modifications of the invention.

The invention may be considered both as a combination of elements or element assemblies and in another aspect includes novel subcombinations of elements. Insofar as the combination factor of the invention is considered, it may be considered as made up of three subcombinations in optical alignment. The first is a radiation collector, the second is a rough or coarse band selector and the third, which contains the grating, is the spectrometric element proper which forms a grating spectrum. The instrument may be used to record or indicate simultaneously a whole spectrum or a portion thereof or the grating may be movable to scan the spectrum across a suitable exit slit to get responses in the detector sequential in time and corresponding to the different wavelengths of the spectral band investigated.

The subcombination forming the actual spectrum comprises converging reflecting optics and a grating receiving the converging reflected light together with means which reduce or eliminate the focusing problems of grating spectra produced by converging light means.

In general, the radiation collecting means are of standard known design and although they form a part in the combination of the present invention they are not new elements themselves. The preliminary or coarse selection of spectral bands may be well known elements or they may be new elements and to the extent that they are new elements, this subcombination is also included within the scope of the present application, although from the standpoint of the combination instrument as a whole, the broad spectral band selecting elements may be either new or old.

The invention will be described in greater detail in conjunction with the drawings which illustrate a type of instrument particularly suitable for broad spectral range.

Figure 1:
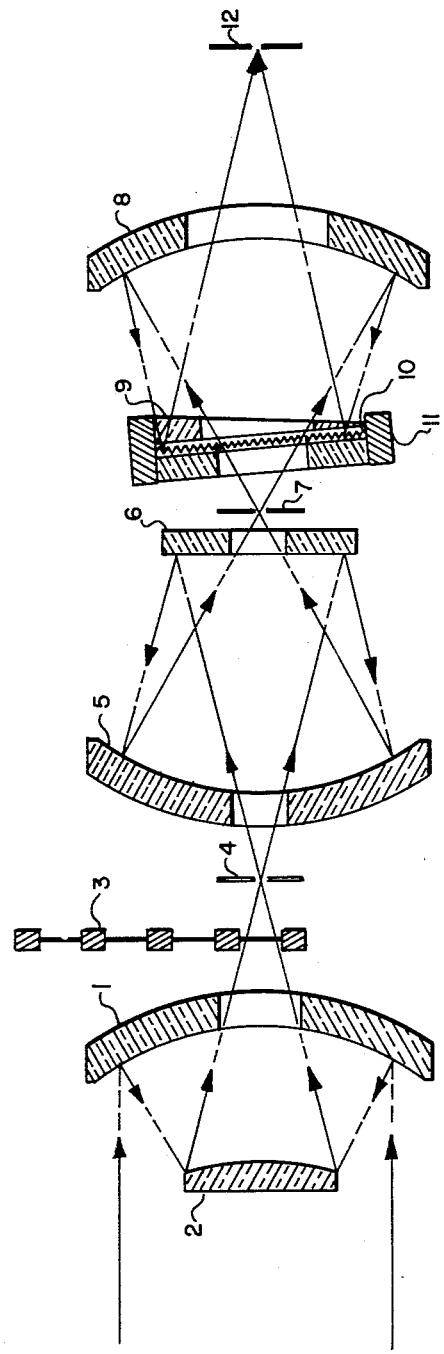
FIG. 1 is a diagrammatic representation in section of a simplified instrument.

In the device shown in FIG. 1 the radiation collector is a Cassegrain primary mirror 1 and secondary mirror 2. The instrument is designed particularly for examining phenomena at a substantial distance so that the radiation collector is illustrated as receiving substantially parallel rays. The reflected rays, which form a hollow cone by reason of the shadow cast by the mirror 2, pass through a filter shown in the form of a filter slide 3 and through an entrance slit 4. The Cassegrain collecting optics are conventional in design and can be replaced by any conventional collector for the radiation in question. The particular filter in the slide selects a sufficiently narrow bandwidth so that there is no interference in the instrument from higher order spectra.

The remainder of the instrument which constitutes the spectrometer or fine dispersion section employs an elliptically figured mirror 5 which is similar in general structure to a Cassegrain primary mirror except for the elliptical figuring. The radiation from the entrance slit 4 strikes the plane mirror 6 which has a hole around the optic axis. The rays are reflected by the mirror 6 onto the mirror 5 which converges them onto a second slit 7. From this slit the rays strike a second elliptically figured mirror 8 provided with a central opening. This mirror produces a convergent beam which passes through a correcting prism 9 striking a reflecting grating 10 in a tilting mount 11. The grating and prism are suitable for the radiation band to be examined, that is to say, the prism is of material which is transparent for the band of radiation and the grating is preferably blazed for a wavelength within the band. The rays are then imaged on the slit 12 which is the entrance slit of a radiation detector of conventional design (not shown). It will be noted that the section through the instrument is at right angles to the plane in which the spectral images are dispersed and to the grating lines themselves.

The rays of any one wavelength coming from various portions of the tilted grating will cross the optical axis at different points. This produces a blurred image and is the reason why it is an optical axiom that gratings cannot be used with a converging beam of radiation if any sharp images are to be obtained such as are required for high resolution. In the portion of the present instrument producing the grating spectra, this problem which has made the use of converging light on gratings impractical in the past, is corrected by the prism 9. A suitable prism angle is computed, as will be developed later, and the effect of the prism is to change the angle of the rays incident on and diffracted from the grating in such a way that rays at all obliquities from the optical axis are finally united in a common intersection, or image point.

It will be noted that the correction by the prism 9 is perfect for only one wavelength in each spectral octave which would normally be chosen in the middle of the spectral band. The correction is not complete at other wavelengths in the band and becomes least complete at the edges of the band. However, the correcting effect of the prism produces so great an improvement over a wavelength band of practical width that the instrument can be used in spite of the fact that the grating is being illuminated by a converging beam of radiation. The design in which the prism 9 and the grating are in fixed relation to each other is simple requiring no additional moving parts, cheap and extremely rugged. Where the bandwidth is not excessive and where the requirements of resolution are moderate the instrument represents the best compromise between resolution, bandwidth, cost, size and ruggedness.

If it is desired to operate the instrument in other bands the filter slide 3 may be moved to pass the desired band and bands of shorter wavelength can be examined by using higher orders of spectra. There is no interference with the lowest order or with still higher orders because of the elimination of radiation of these wavelengths by the filter.

Theoretically it would be possible with a single grating to use the instrument for all optical radiations from the ultraviolet to the far infrared. However, grating effectiveness is at a maximum for a radiation band for which the grating is blazed. Therefore, when it is desired to obtain a high degree of resolution in a number of bands of widely separate wavelengths this can easily be done by changing gratings and prisms in the tilting mount. Another method which has advantages under extremely adverse operating conditions, such as may be encountered in military use, is to have the whole section from mirror 5 to slit 12 mounted in a separate section of tube which can be screwed or otherwise firmly fastened to the tube housing the radiation collector and to the detector. This modification in which gratings and prisms for different widely separate bands are changed by changing the whole section is more costly than the insertion of new gratings and prisms in the mounting 11. However, where the operating conditions are particularly severe the greater protection of the elements will often warrant the higher expense. The choice of the method of changing prisms and gratings is therefore dictated not by any limitations of the instrument but by the economics of the particular conditions of use. It is an important practical advantage of the present invention that the instrument can be adapted to a wide variety of operating conditions without sacrifice of efficiency and accuracy.

It will be noted that the Cassegrain collector produces a beam that is a hollow cone by reason of the shadow of the mirror 2. This hollow characteristic of the beam persists throughout the instrument. As a result there is no loss in efficiency provided, of course, that the openings in the mirrors 5, 6 and 8 and in the prism 9 and grating 10 are dimensioned so that they do not further limit the light beams. This is shown in FIG. 1 by the fact that the boundary rays of the beam are not lost and the whole effective annular cross section of the beam is utilized. This efficiency in light utilization is often of great importance where the available radiation energy is limited within the wavelengths to be investigated. As a result the instrument is of high efficiency and this is one of the practical advantages. A further advantage lies in the fact that it is possible to use optics of very large relative aperture even as great as $f/2$ or larger.

The filter slide 3 has been shown as introducing single filters. This is illustrative only as in many cases the filters will be double filters, with both high pass as well as low pass elements.

Figure 2:
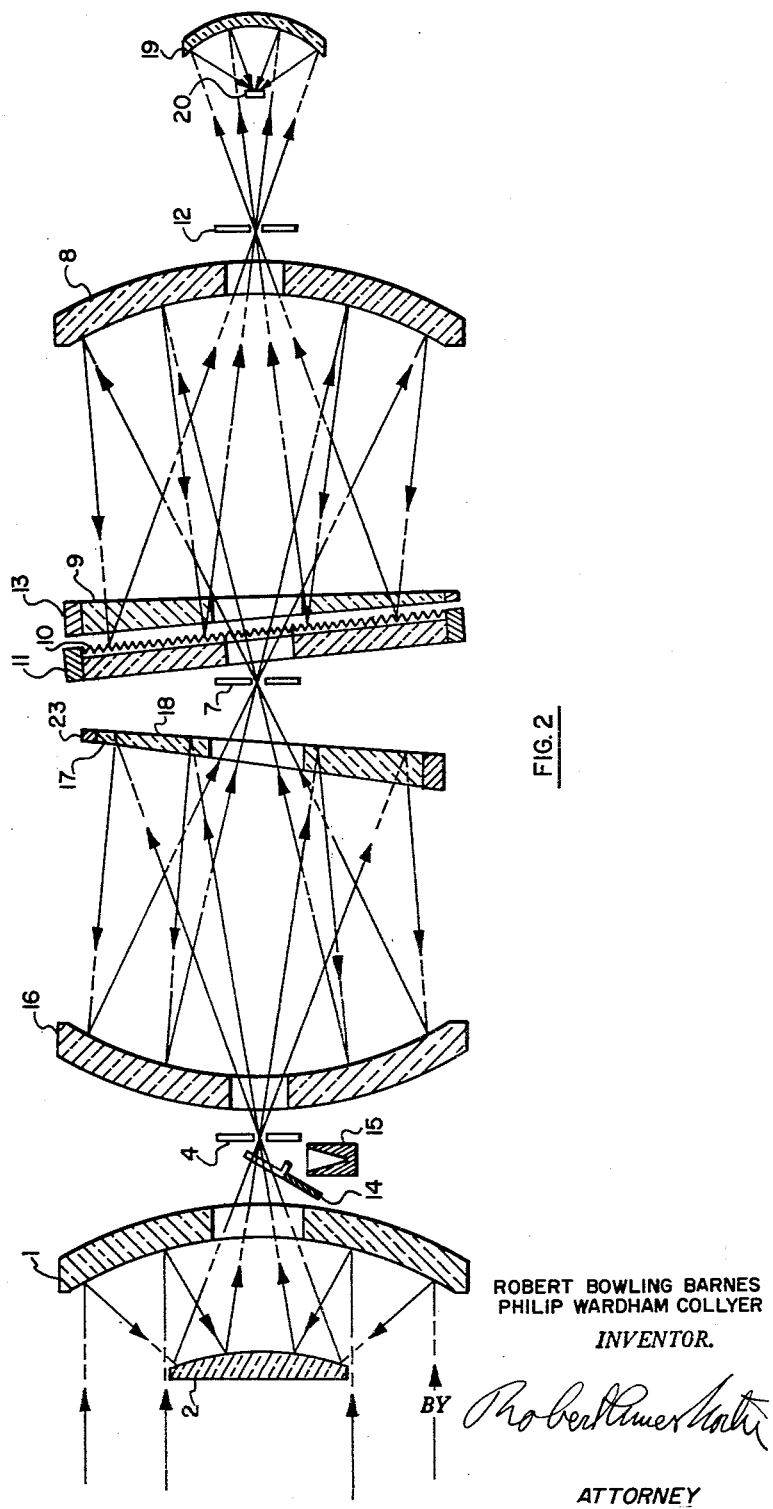
FIG. 2 is a diagrammatic representation in section of a similar instrument provided with complete focusing correction for all wavelengths, a chopped infrared comparison source and a different design of coarse spectral band selector.

FIG. 2 illustrates a modified form of instrument, the same elements bearing the same reference numerals. The Cassegrain collector section is the same as in FIG. 1 but a different type of coarse spectral selection optics is used and black body comparison is introduced. The beam from the Cassegrain collector strikes a mirrored chopper wheel 14 of conventional design before passing through slit 4. The bottom faces of the chopper blades are mirrored and reflect from a reference black body cavity 15 of conventional design which is thermostated. As a result the beam alternately contains the radiation from the Cassegrain collector and the radiation from the reference black body cavity. The chopper is of conventional design and operates at a low frequency, for example, from about 20 to 100 c.p.s. depending on the time constant of the infrared detector.

The two beams, alternately emerging from the slit 4, strike a foreprism of sodium chloride or other suitable material 17, the rear face of which bears a mirror coating 18. The prism is mounted in a tiltable mounting 23 and can be tilted to select roughly particular spectral bands. The dispersed rays then strike an elliptically figured mirror 16 of design similar to the mirror 8 of FIG. 1. This focuses the beam on the entrance slit to the spectrometer or monochromator section proper.

This section is similar to the right-hand portion of the section in FIG. 1, the elliptically figured mirror being of the same design as are the prism 9 and grating 10. However, the prism is independently mounted in a tiltable mounting 13 driven by conventional means (not shown) from the driving means for the tilting mounting 11 of the grating. The prism and grating are tilted in different directions and the prism is moved by the grating-tilting means through suitable variable ratio driving means such as a cam the contour of which is generated in accordance with the mathematical equations set out below for prism movement to correct the focusing of different wavelengths. In the figure the angle between the prism faces and the grating are shown as only slightly different in order to make it easier and clearer to illustrate the ray paths. In practice the difference in tilt between the prism and the grating may be somewhat greater. It should be realized that the figure is a diagrammatic showing only. The rays from the mirror 8 and grating 10 passing therethrough are shown without the bending in the prism itself. They come to a sharp focus on the entrance slit 12 of the detector, by which is meant that they cross the optical axis at the same point. This restricted meaning of the term "focus" will be used throughout the specification and claims.

As the illustration in FIG. 2 is for a device which is to be used in the infrared, a typical infrared detector is illustrated having a conventional condensing mirror 19 and detector proper 20.

The operation of an instrument in which the prism 9 is independently tiltable permits perfect focusing for all wavelengths instead of the approximation of the fixed prism of FIG. 1 which gives perfect focus correction for only one wavelength in each spectral octave. The superior resolution throughout the whole spectral band of the instrument with the independently movable correcting prism is obtained at the expense of some additional elements for driving the prism and grating independently with the resulting slight increase in complexity. The ruggedness for operation under extreme conditions is also slightly decreased as the introduction of any mechanical movement permits just that much more possibility for damage or misadjustment where the operating conditions are extreme.

The interchangeability of grating and prism is retained and, of course, it is possible to have the whole monochromator section mounted in a single section of tubing which permits replacement as a whole as was described in conjunction with FIG. 1.

It will be noted from an examination of FIGS. 1 and 2 that the mirror 8 operates at a two to one ratio between object and image distance. This permits a very efficient energy utilization as none of the effective energy in the hollow beam from the Cassegrain collector is wasted. It should be understood that this pair of conjugates of the mirrors is not sharply critical and is dictated primarily for considerations of efficiency. When the ratio between image and object distance is much below two to one, some of the beam is intercepted by the back of the grating and by other portions of the instruments. On the hand, a much greater ratio will also result in the loss of some beam energy and a less compact instrument. It is an advantage of the invention that the mirror design is not sharply critical but it is preferred to operate with object to image distances not differing too greatly from two to one.

The effect of the prism 9 in correcting, partially or wholly, the focusing of the rays on the detector at different wavelengths has been described and the ray tracing in the figures shows the effect of purely geometrical correction. It should be understood that grating spectrometers, in which the grating is illuminated with a convergent beam, present two types of problems. The most important single one is concerned with the geometrical optics of the system, that is to say with the differing path lengths bringing different rays to focus in a different plane. The second problem, however, is presented by the fact that the beam strikes the tilted grating at different angles in different portions of the grating. This results in a problem in physical optics. When the grating is tilted in a convergent beam, the apparent spacing is proportional to the cosine of the angle of the incident rays with the normal to the grating surface.

If the spacing of the lines on the grating is varied in inverse proportion to the cosine of the angle, the error is reduced to one-third. But, this is impractical as the correction would be for only one angle of tilt and variable spaced gratings are prohibitively expensive. The error described above is quite small in comparison with the error due to difference of path lengths.

The path length difference can be corrected completely by the prism for one wavelength in each band in the simple instrument of FIG. 1 and for all wavelengths over a substantial bandwidth in the instrument of FIG. 2.

It is an advantage of the present invention that the prism or refracting element correcting for the path length difference also reduces other errors to so small a value that in practical operation they may be neglected.

Figure 4:
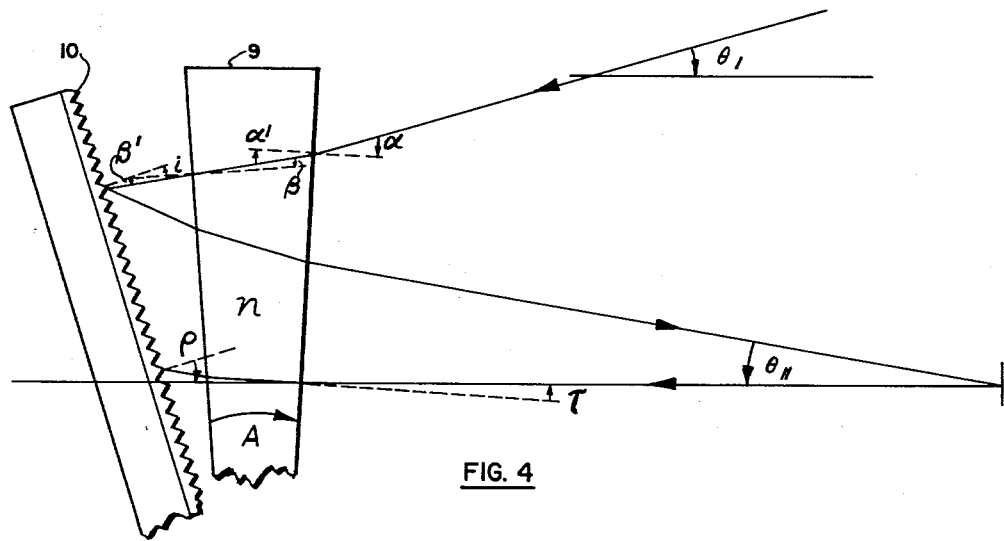
FIG. 4 is a diagram of the ray tracing determining the equations of prism characteristics and orientation.

FIG. 4 illustrates the ray tracing on which the corrections described above are based. The discussion of this figure includes definitions of quantities, sign convention and the development of the necessary equations.

*Definitions*

$\theta_1$=inclination of ray incident on prism with respect to optical axis.
$\alpha$=angle of incidence of ray on first surface of prism.
$\alpha'$=angle of refraction at first surface of prism.
$\beta$=angle of incidence of ray on second surface of prism.
$\beta'$=angle of refraction at second surface of prism.
$i$=angle of incidence of ray on grating.
$A$=refracting angle of prism.
$\tau$=inclination of normal of first prism surface to optical axis.
$\rho$=inclination of grating normal to optical axis.
$n$=index of refraction of prism.
$m$=grating order.
$\lambda$=wavelength.
$d$=grating spacing in same units as $\lambda$.

*Sign convention*

$\theta_1$ is considered positive if ray must be rotated clockwise to become parallel to optical axis.

$\alpha$, $\alpha'$, $\beta$, $\beta'$, $i$, $i'$ are positive if ray must be rotated clockwise to become parallel to surface normal.

$A$ is positive if second surface of prism must be rotated clockwise to become parallel to first surface.

$\tau$, $\rho$ are positive if surface normals must be rotated clockwise to become parallel to optical axis.

*Mathematical analysis*

A ray directed toward the prism-grating combination with an inclination $\theta_1$ relative to the optical axis is refracted at both prism surfaces and then falls on the grating, having an angle of incidence $i$ from the grating normal.

A ray from the opposite side of the aperture having an inclination $-\theta_1$ is also refracted at the prism faces and strikes the grating at an angle of incidence $i'$. The rays are then diffracted by the grating, again refracted by the prism, and finally converge toward the image point.

It has been found that correction is obtained if such a pair of rays strike the grating such that $$\sin i + \sin i' = m\lambda/d \quad (1)$$

The values of $i$ and $i'$ may be derived from conventional formulas as follows:

$$\alpha = \theta_1 - \tau \quad (2)$$
$$\sin \alpha' = \sin \alpha / n \quad (3)$$
$$\beta = \alpha' - A \quad (4)$$
$$\sin \beta' = n \sin \beta \quad (5)$$
$$i = \beta' + (A+\tau) - \rho \quad (6)$$

These may be combined to yield expressions for $i$ and $i'$ as follows:

$$i = \sin^{-1}\left(n \sin\left\{\sin^{-1}\left[\frac{\sin(\theta_1-\tau)}{n}\right] - A\right\}\right) + (A+\tau) - \rho \quad (7)$$

$$i' = \sin^{-1}\left(n \sin\left\{\sin^{-1}\left[\frac{\sin(-\theta_1-\tau)}{n}\right] - A\right\}\right) + (A+\tau) - \rho \quad (8)$$

Although these could be solved for the specific value of $A$, for example, which satisfies the condition $\sin i + \sin i' = m\lambda/d$, it is far easier in practice to try a value of $A$ thought to be approximately correct, then solve for $i$ and $i'$ and test them in Equation 1. Three trials are ordinarily adequate to find the exact value of $A$ required.

Although it is not necessary that the grating face be parallel to the second prism face, this arrangement provides for most compact mounting of parts. Furthermore, the value of A giving full correction at a given wavelength is most easily derived if this condition is established. Then $A+\tau=\rho$, and the equations for $i$ and $i'$ are simplified by elimination of these terms. Using a trial value of A, and letting $\theta_1=0$ and $i=\sin^{-1}(m\lambda/2d)$, we first solve for $\tau$.

Physically this tells us the rotational position of the grating and prism which will cause a ray coincident with the optical axis to fall on the grating at such an angle that it is diffracted back along its original path. (The fact that in a pierced mirror spectrometer the beam is a hollow cone and, therefore, such a ray may not be existing physically does not detract from the usefulness of this method of analysis.) A further advantage of the procedure is that the image formed by wavelength $\lambda$ will be on the optical axis.

Having determined $\tau$ we then insert a value of $\theta_1$, which may, for maximum precision of computation, be that of the full aperture rays and solve for $i$. Similarly we solve for $i'$, using $-\theta_1$ as shown. For evaluating the result of this combination of parameters, we then test $i$ and $i'$ for conformance to the requirement of Equation 1. This may be written in the more generalized form:

$$\sin i + \sin i' - m\lambda/d = \psi$$

where, in the presence of perfect correction, $\psi=0$. In general, the first trial will result in a value of $\psi$ not equal to zero, which indicates that the prism angle selected will not give perfect correction, at least with the grating parallel to the second prism face.

A second value of A is then used as above, and a new value of $\psi$ is found. If these values of $\psi$ are sufficiently close to each other and to zero, interpolation or extrapolation usually yields the correct value of A on the next try.

The second type of problem consists of finding the correct setting (if any) of prism and grating to give perfect correction using a given prism and grating.

In this procedure the same general equations are used in a different way. Using the fixed value of A, we take a trial value of $\tau$, and letting $\theta_1=0$, find the value of $\rho$ which will give a value of $i=\sin^{-1} m\lambda/2d$. Again, this means physically that we have found the angular position of the grating which, with the prism of angle A and refractive index $n$ set with the first face at the angle $\tau$, will cause the axial ray to be diffracted back along its original path.

We next insert the appropriate values of $\theta_1$ and $-\theta_1$ and solve for $i$, $i'$, and $\psi$. Again, successive values of $\tau$ are tried until $\psi$ has been reduced essentially to zero. The resulting values of $\rho$ and $\tau$ indicate the proper settings of the grating and prism for this value of $\lambda$.

The values obtained by approximation as described above need only be sufficiently accurate so that any inaccuracy in the correction is less than other defects in the image resulting from other causes. Therefore, throughout the specification and claims when mention is made of complete correction for any particular wavelength it should be understood that this means that the correction is sufficiently perfect so that inaccuracies in it are no greater than other image defects. In obtaining the information for a variable ratio connection between the ratio of the grating and the prism in the device shown in FIG. 2, it is only necessary to obtain a sufficient number of paired values of $\tau$ and $\rho$ to satisfy the requirements of the designer for the variable ratio connections such as a cam. It is an advantage that the precision required for the relations of $\tau$ and $\rho$ are well within the limits of accuracy of simple, cheap variable ratio connections.

Figure 3:
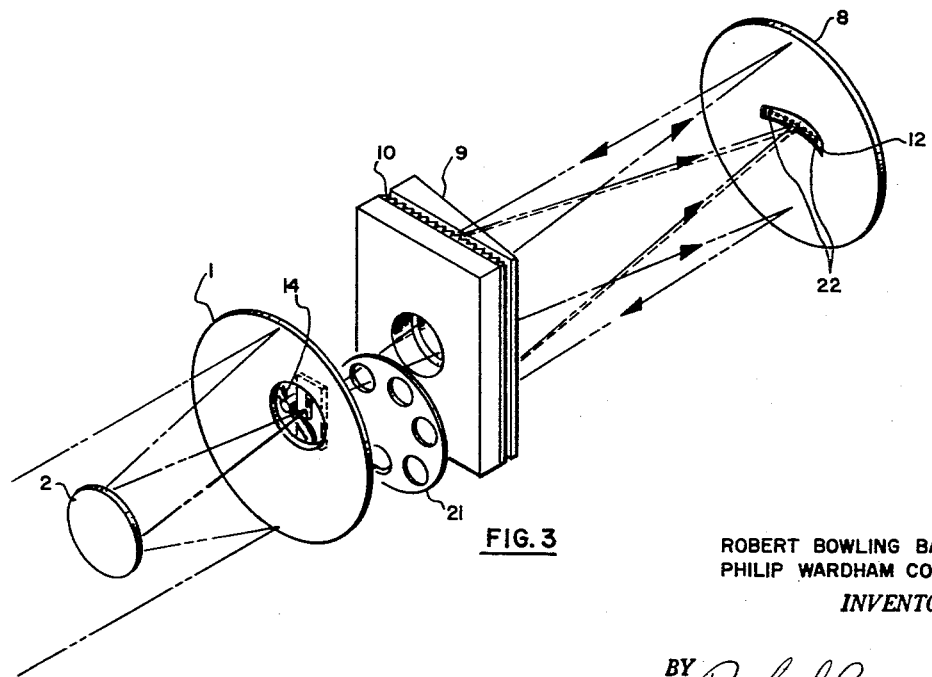
FIG. 3 is a perspective of a further simplified instrument for a simultaneous recording of a spectral band.

FIG. 3, in which the same parts bear the same reference numerals, illustrates an extremely compact instrument of great simplicity which corrects partially the focusing problems as described in connection with FIG. 1. It is particularly useful for the simultaneous production of a whole spectrum or of selected lines on a detector array which is capable of simultaneous recording. This will be described in greater detail below.

The Cassegrain radiation collector is the same as in FIGS. 1 and 2. The filters, however, are in the form of a filter wheel 21 and the chopper 14 is located directly in the beam before the first slit 4. In this device the beam is chopped but there is no comparison with a black body reference as is described in connection with FIG. 2.

The chopped beam from the slit 4 passes through the hole in the middle of the grating 10 adjacent to which prism 9 is mounted, strikes the elliptically figured mirror 8, is reflected through the prism 9 encountering the grating 10 and then is spread out as a spectrum along the extended detector slot 12. This slot is extended to permit a detector capable of responding to the various spectral lines. As illustrated the device is for the infrared and the detector is a series of infrared detectors 22 sensitive to the radiation band to be investigated. A.C. signals from these detectors are produced and may be recorded, telemetered or the like. The compact simplified device is, therefore, suitable for rocket, satellite or other uses where information has to be telemetered.

When the device of FIG. 3 is to be used for radiations to which photographic surfaces are sensitive, i.e., from the ultraviolet into the near infrared, the chopper 14 is eliminated and the detector becomes a camera with a photographic plate.

We claim:
1. A monochromator comprising in combination, in optical alignment and in a straight line a first slit, a reflecting grating having an axial opening, a converging mirror positioned to produce a converging beam of radiation from said first slit as a divergent source, said beam converging onto the annular portion of the reflecting grating, a second slit, an axial opening in the converging mirror and a prism positioned between the grating and the converging mirror and having an axial opening, the position of slits, mirror and grating imaging the first slit at a predetermined diffracted wavelength onto the second slit and the prism being of a material and angle to bring the diffracted beam from the grating at one wavelength to a single image plane at the second slit.

2. A monochromator according to claim 1 in which the two slits form conjugate points related to the converging mirror with optical path lengths in a ratio of approximately two to one.

3. A monochromator according to claim 1 in which the grating and the prism are independently rotatable about a central axis in their plane at right angles to the optical axis of the monochromator.

4. A monochromator according to claim 3 in which there is provided a varying ratio drive means between grating and prism rotating the element in opposite directions, the ratio variation of the drive being such that the prisms bring diffracted rays from the grating to a single image plane at the second slit for all wavelengths in a predetermined bandwidth.

5. A monochromator according to claim 4 in which the second slit is in the form of an opening extending in the direction of the spectrum of diffracted rays produced by the grating.

No references cited.